United States Patent
Schmider et al.

(10) Patent No.: US 7,104,562 B2
(45) Date of Patent: Sep. 12, 2006

(54) CANTILEVER REAR SUSPENSION FOR A BICYCLE

(75) Inventors: John Schmider, Thornhill (CA); Fabio Venier, Holland Landing (CA)

(73) Assignee: Manfred Gingl, Kettleby (CA)

( * ) Notice: Subject to any disclaimer, the term of this patent is extended or adjusted under 35 U.S.C. 154(b) by 0 days.

(21) Appl. No.: 10/808,385

(22) Filed: Mar. 25, 2004

(65) Prior Publication Data

US 2004/0188978 A1    Sep. 30, 2004

Related U.S. Application Data

(60) Provisional application No. 60/457,626, filed on Mar. 26, 2003.

(51) Int. Cl.
*B62K 25/28* (2006.01)
(52) U.S. Cl. ...................................... 280/284
(58) Field of Classification Search ................ 280/283, 280/284
See application file for complete search history.

(56) References Cited

U.S. PATENT DOCUMENTS

| | | | |
|---|---|---|---|
| 2,082,147 A * | 6/1937 | Bryant ........................ | 280/284 |
| 4,421,337 A | 12/1983 | Pratt | |
| 4,789,174 A | 12/1988 | Lawwill | |
| 5,121,937 A * | 6/1992 | Lawwill ..................... | 280/284 |
| 5,133,244 A | 7/1992 | Giamello | |
| 5,217,241 A | 6/1993 | Girvin | |
| 5,244,224 A | 9/1993 | Busby | |
| 5,316,327 A | 5/1994 | Bell | |
| 5,413,368 A * | 5/1995 | Pong et al. ................. | 280/277 |
| D368,880 S * | 4/1996 | Harrington ................. | D12/117 |
| 5,685,553 A | 11/1997 | Wilcox et al. | |
| 5,938,224 A | 8/1999 | Brackett | |
| 5,997,022 A * | 12/1999 | Matsui ....................... | 280/284 |
| 6,149,175 A * | 11/2000 | Fujii .......................... | 280/284 |
| 6,149,176 A * | 11/2000 | Fujii .......................... | 280/284 |
| 6,474,669 B1 * | 11/2002 | Colwell ...................... | 280/260 |

FOREIGN PATENT DOCUMENTS

| | | |
|---|---|---|
| DE | 58 445 C | 8/1891 |
| DE | 118 099 C | 2/1901 |
| DE | 808 190 C | 7/1951 |
| DE | 825 059 C | 12/1951 |
| FR | 559 615 | 9/1923 |

OTHER PUBLICATIONS

Ballantine, Richard and Richard Grant, Ultimate Bicycle Book, 1998, pp. 42, 43 and 103, Firefly Books Ltd., Willowdale, Canada.

* cited by examiner

*Primary Examiner*—Kevin Hurley
(74) *Attorney, Agent, or Firm*—Bereskin & Parr

(57) ABSTRACT

A bicycle is equipped with a rear wheel suspension having a swing arm with one or more generally cantilevered side arms, which are capable of withstanding bending and torsional loads and isolating said loads from the rider. A bottom portion of the bicycle frame includes a pedal sleeve. A pedal or crank assembly rotates within the pedal sleeve about a rotational axis with a fixed location relative to the frame. The swing arm is pivotally secured to the frame for movement about the rotational axis. A shock-absorbing element is connected between the swing arm and the frame.

25 Claims, 15 Drawing Sheets

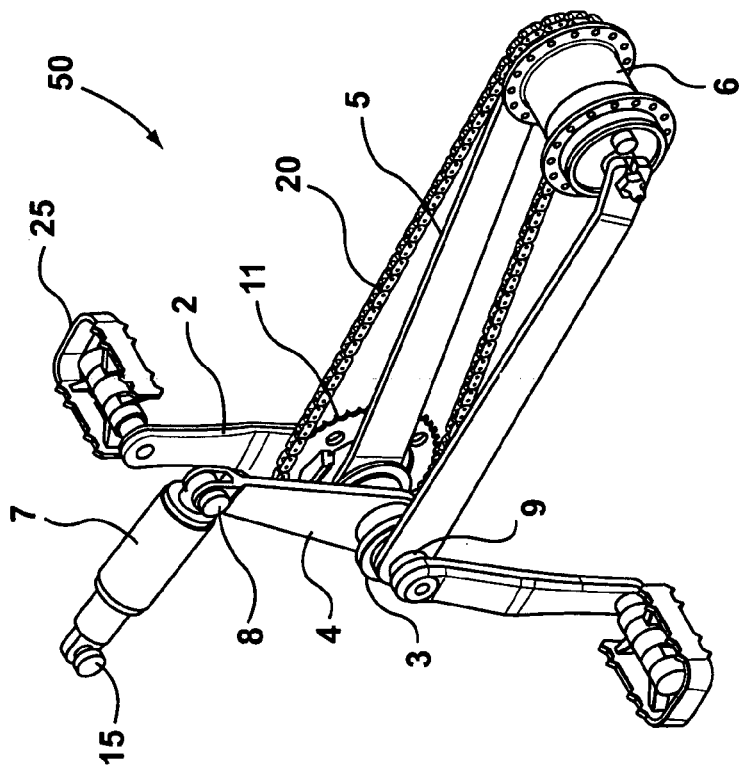
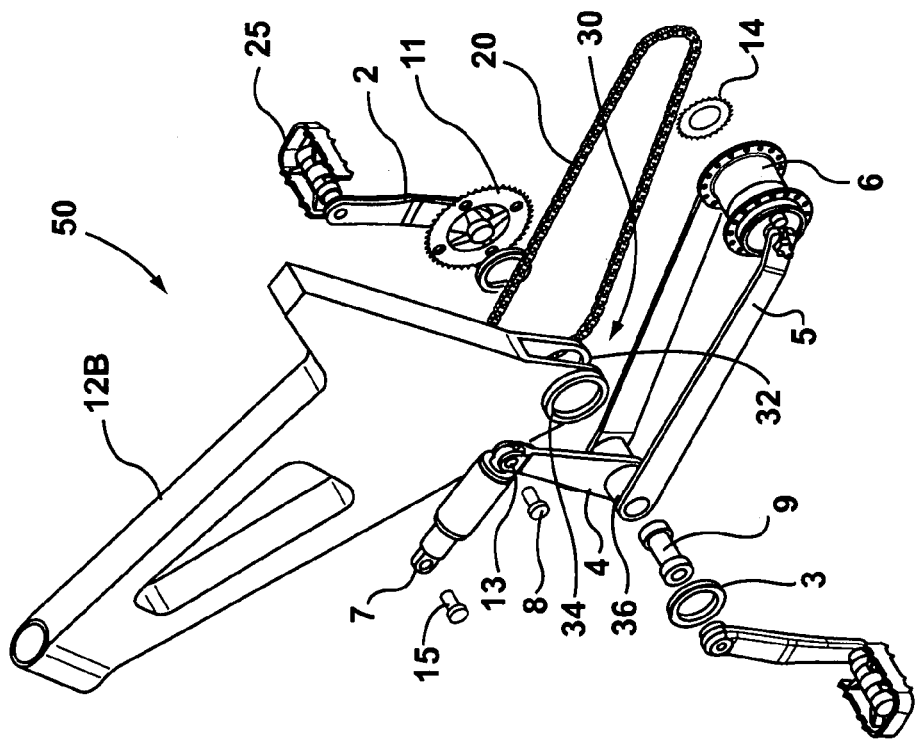

CANTILEVER REAR SUSPENSION FOR A BICYCLE

This patent claims the benefit under 35 USC 119(e) of U.S. Provisional Application Ser. No. 60/457,626 filed Mar. 26, 2003, which is incorporated in full herein by this reference to it.

FIELD OF THE INVENTION

The subject invention is generally related to bicycles, and is specifically related to a rear suspension system for a bicycle.

BACKGROUND OF THE INVENTION

Bicycles have been utilized as a means of transportation for over a hundred years and continue to grow in popularity. The mountain bike is one type of bike that has become more and more popular in recent years. These types of bikes are often used in rough terrain, leading to an uncomfortable ride. Therefore, some recently designed bicycle frames include a rear suspension system. Bicycles equipped with suspension attempt to provide increased rider comfort, enhanced wheel contact and control, and less net rolling resistance without significantly increasing the cost, complexity or maintenance requirements of the bicycle.

However, no prior art suspension system meets all of these goals. Some systems are heavy, complex or require frequent maintenance. Some systems also cause adverse effects on other parts of the bicycle. For example, the distance between the crank axis, the axis that the pedals rotate around, and the axle of the rear wheel may vary with compression of the suspension system, forcing the transmission components to deal with increasing and decreasing amounts of chain slack. Some systems also create undesired reactions. For example, a rear suspension may cause "pogoing", or movement of the axle through the rear wheel up or down relative to the rest of the frame as a reaction to pedaling forces. A rear suspension may also cause "biopacing" whereby movement of the crank arms accelerate or decelerate as a reaction to compression or decompression of the suspension. Pogoing and biopacing effects are particularly present in suspension systems where the chain slack varies as the suspension system compresses.

In particular, some rear suspension systems have multiple pivot points. These systems are generally complex and therefore expensive to manufacture. They also are subject to wear in multiple locations. U.S. Pat. No. 4,789,174, for example, describes a system having many pivot points including two pivot points directly above and below the rear wheel axle. These pivot points add significant complexity to the system and cause the distance between crank axis and rear axle to vary as the suspension system compresses.

U.S. Design Pat. No. 368,880 discloses another rear suspension system. In this system, a chain stay assembly pivots on the opposed ends of a bottom bracket tube. A pair of spring units connect the chain stays to the seat tube in about the location where the seat stays would normally be. The distance between the crank axis and rear axle remains constant, but this design requires two long stroke spring units, thereby increasing cost, complexity and maintenance.

U.S. Pat. No. 5,685,553 discloses another suspension system having a rear triangle that pivots on a frame. A bottom bracket and a rear wheel are both contained in the rear triangle. In this way, a fixed chain length is provided. However, pivoting of the rear triangle also moves the bottom bracket relative to the frame, causing the distance and angle between the seat and pedals to change while riding.

SUMMARY OF THE INVENTION

The subject invention provides a rear wheel suspension system for a bicycle. The suspension has a main frame for holding the seat and front forks. The main frame also has a bottom portion including a pedal sleeve. A pedal or crank assembly rotates within the pedal sleeve about a rotational axis which may be called a crank axis. The crank axis has a fixed location relative to the frame. A swing or trailing arm is pivotally secured to the frame for movement about the rotational axis. The swing arm may have one or two generally cantilevered side arms. The axle of the rear wheel has a fixed location relative to the swing arm. A shock-absorbing element is connected between the swing arm and the frame. The shock-absorbing element may be centrally located, that is located near a line between the front and back tires, or with some or all of the shock-absorbing element within the width of the tires. A rear wheel suspension system for a bicycle may have a frame, a pedal sleeve attached to and rotatable relative to the frame about a rotational axis having a fixed location relative to the frame, a pedal assembly secured and rotatable within the pedal sleeve, a trailing arm fixed for rotation with the pedal sleeve, and a shock absorbing element connecting the trailing arm to the frame to resist rotation of the trailing arm. A suspension system for a bicycle may comprise, a frame having a bottom portion with two sides, a pedal assembly secured for rotation to the bottom portion of the frame and rotatable about a rotational axis, a trailing arm secured to the bottom portion of the frame between the two sides of the frame and pivotable about the rotational axis, and a shock absorbing element connecting the swing arm to the frame.

The invention may provide a number of desirable characteristics. For example, the bearings for the swing arm have a single pivot point and may have a large surface area. This tends to reduce unwanted play, particularly after extended use. Since the rotation axis of the trailing arm is coaxial with the crank axis, the chain length required to connect the front and rear sprockets remains constant regardless of the position of the rear suspension. Therefore, biopacing or pogoing may be reduced and the stress on a chain tensioner is reduced, such that a chain tensioner is no longer required, in some cases. The position of the crank axis remains fixed relative to the seat and the suspension has a small number of pieces to reduce fabrication and assembly costs. The suspension may also allow the rear suspension to swing forward so that the bicycle can be arranged into a compact shape for storage.

The invention also provides various additional aspects or features. In one such aspect, the swing arm is attached to the frame through a lever arm. The lever arm may extend from the pedal sleeve and rotate about the rotational axis of the crank assembly at a fixed angular displacement from the swing arm. For example, the lever arm may extend upwards from the pedal sleeve. This allows the lever arm and shock-absorbing element to be hidden between the sides of a monocoque frame.

In another aspect, the pedal sleeve may rotate relative to the frame about the rotational axis of the crank assembly. In this case, the swing arm is fixed to the pedal sleeve and rotates with the pedal sleeve. A lever arm may also be fixed to the pedal sleeve and rotates with the pedal sleeve. The pedal sleeve thus provides a structure for connecting sides of a swing arm together or to the lever arm, even through these various parts may be separated by parts of the frame. For example, the lever arm may be located between two sides of a frame, as described above, while the swing arm has a side arm located outside of the shell.

In another aspect, the bottom portion of the frame may have two sides with the trailing arm secured to a point between the two sides. A lever arm, as described above, may also be provided between the two sides. The sides may be part of a stressed shell, for example a monocoque or semi-monocoque shell.

In other aspects, the swing arm may have a single side arm. The single side arm may be adapted to hold or include a rear wheel hub body. A side arm on the chain side may comprise a portion having a channeled cross-section or having one or more covers to enclose a portion of the chain. The side arm and covers may be configured to provide a torsion box. Hydraulic pumps and motors may be used to dispense with chains and sprockets.

The description above is intended only to introduce the reader to the invention. Aspects of the invention may reside in a combination or sub-combination of elements described above or in other parts of this patent, or be described in the claims.

BRIEF DESCRIPTION OF THE DRAWINGS

Other advantages or aspects of the present invention will become apparent in the following detailed description of exemplary embodiments which will be discussed in connection with the accompanying drawings wherein:

FIG. 2A is a left perspective view of the suspension system of the first embodiment, with components in exploded form;

FIG. 2B is a left perspective view of the suspension system of the first embodiment;

DETAILED DESCRIPTION OF EXEMPLARY EMBODIMENTS

Figure 1:
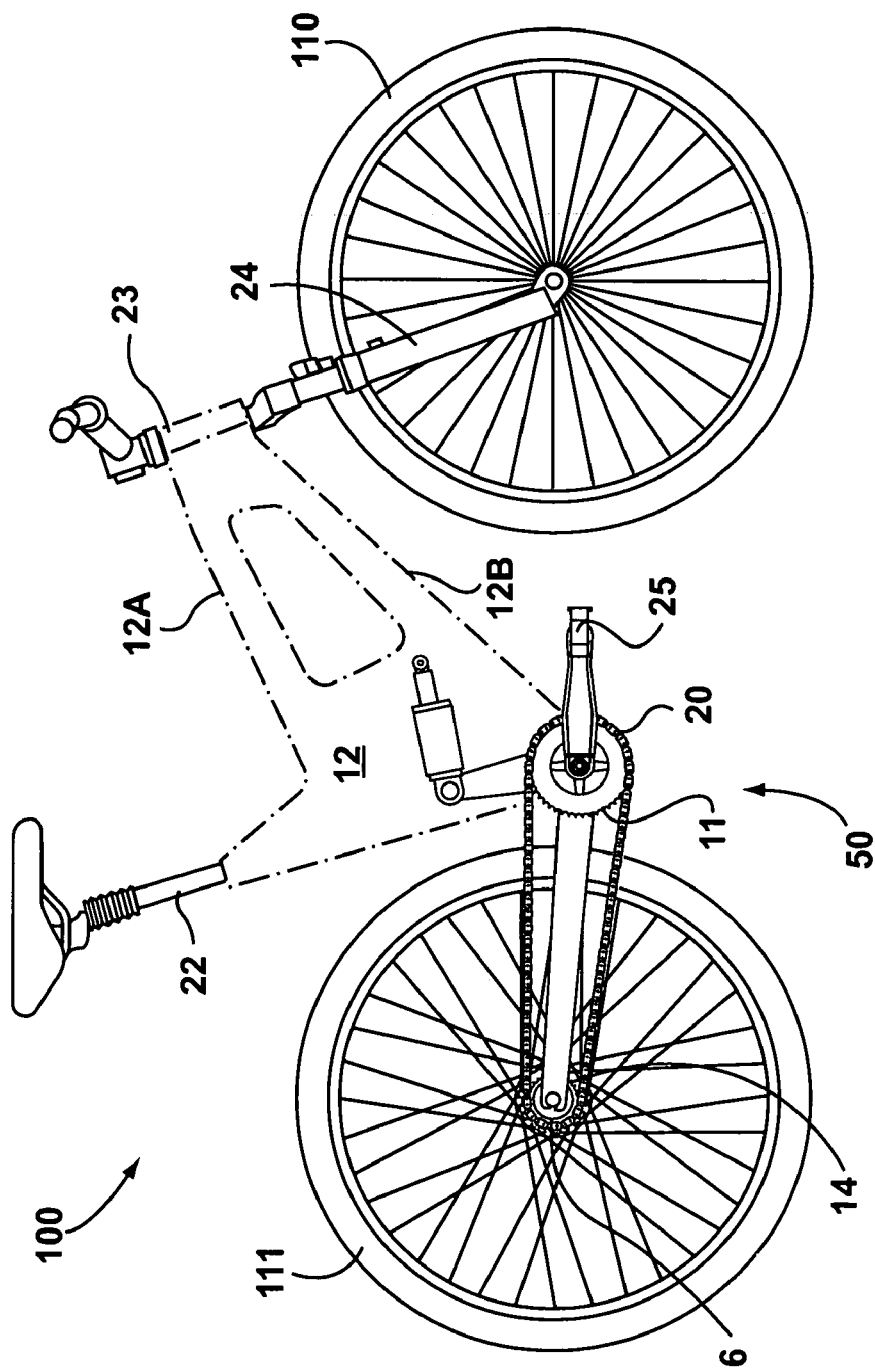
FIG. 1 is a right side elevational view of a bicycle showing the design of the frame and the suspension system of the first embodiment of the invention.

FIG. 1 shows a bicycle 100 according to an embodiment of the invention, comprising a main frame indicated in its entirety by the reference number 12. The frame 12 may have a top frame part 12A and a bottom frame part 12B. The frame 12 has two sides which include stressed walls of a monocoque or semi-monocoque shell, although other frame designs may also be used. The frame 12 supports a saddle-bearing tube or seat post 22, an attachment or head tube 23 for the handlebars and a fork 24 to which the front wheel 110 is associated in a conventional manner. The frame 12 is part of a suspension assembly 50 which supports the rear wheel 111. A transmission assembly is of the conventional chain and sprocket type, whereby rotary motion from the pedals 25, acting through crank arms 2, is transmitted to the rear wheel 111 via a chain 20 that is wrapped around a front sprocket 11 and rear sprocket 14, more clearly visible in FIGS. 2A and 2B.

The various components of the suspension assembly 50 are shown in an exploded view in FIG. 2A and an assembled view in FIG. 2B. Coupled to frame 12 is a shock absorber element 7. The shock absorber element 7 may be any device that resists or controls movement of the suspension assembly 50 and may have a spring or other elastomer and a dampener. The shock absorber element 7 is located within the frame 12 which allows a reasonable length for it. The shock absorber element is attached to the frame via a frame pivot pin 15. At the other end of the shock absorber element 7, a second pivot pin 8 is inserted through hole 13 in order to connect the shock absorber to a lever arm 4. The lever arm 4 is fixed to a trailing or swing arm 5 by welding, bonding, bolting or another suitable method. The lever arm 4 and swing arm 5 are also attached to or comprise a pedal sleeve 36. The pedal sleeve 36 may also be called a bottom bracket since it performs the functions of a conventional bottom bracket in that it holds the axle and bearings that the pedals 25 rotate on. The lever arm 4 and swing arm 5 may be attached to each other through the pedal sleeve 36 and the lever arm 4 or pedal sleeve 36 or both may also be formed as integral parts of the swing arm 5. The lever arm 4 can be pointed in any direction or even omitted in favor of attaching the shock absorbing element 7 directly to the swing arm 5, for example to a bar placed between the side arms. However, if the lever arm 4 is pointed in a generally upward direction, for example at an angular displacement of 60 degrees or more from the swing arm 5, it can be located within the frame 12 with the shock absorber element 7, and can have a reasonable length, i.e. greater than the distance between the center of the crank axle and the front of the rear wheel 11, and can be oriented within about 30 degrees of normal to the shock absorber element 7. Further, if the frame 12 is of a clamshell design or monocoque design, then the lever arm 4 and shock absorber 7 can be hidden from view within the frame shell.

Figure 3:
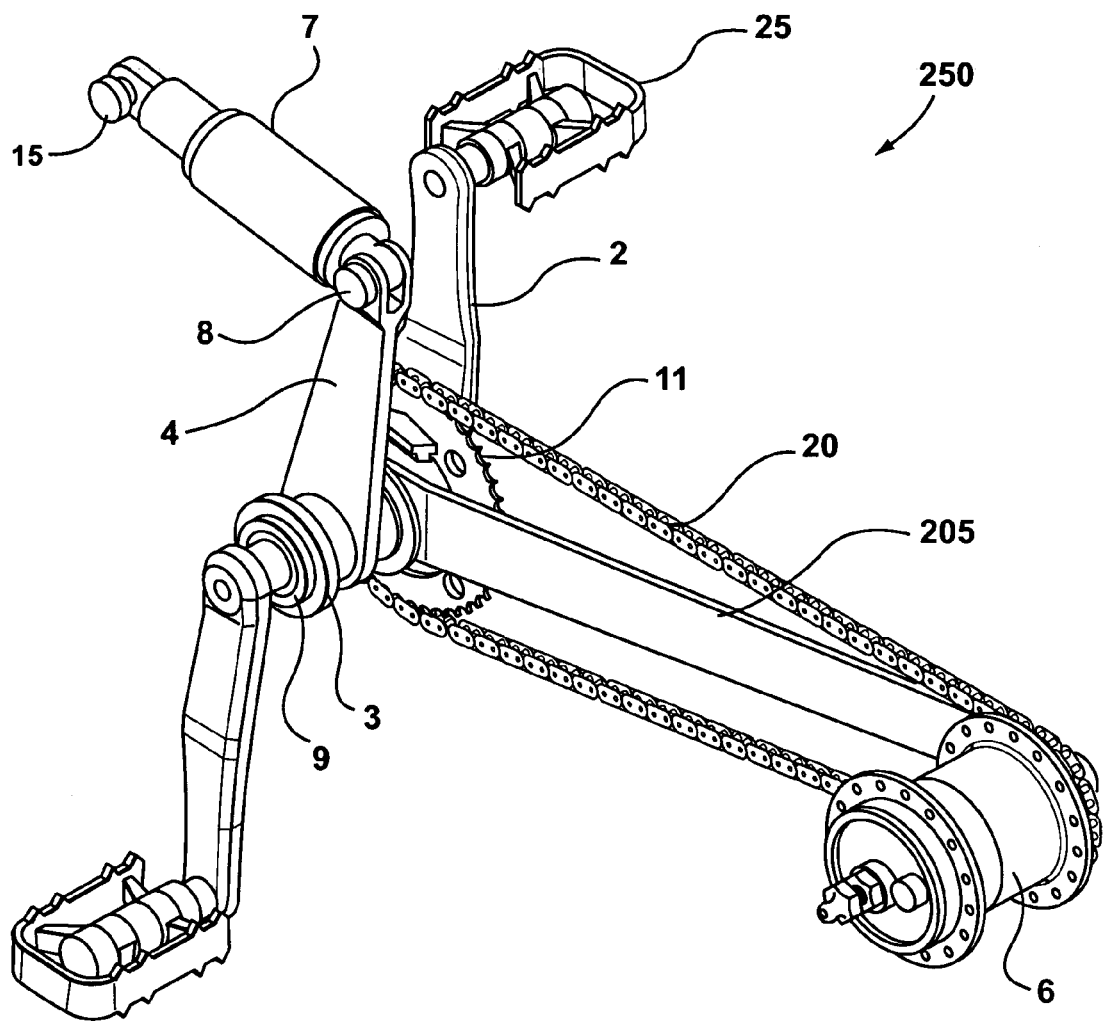
FIG. 3 is a left perspective view of the suspension system of the second embodiment, illustrating a different form of swing arm.

The swing arm 5 illustrated in FIGS. 2A and 2B has two side arms that attach to either side of the rear hub 6 that forms part of the rear wheel 111. In an alternate embodiment illustrated in FIG. 3, a single sided swing arm 205, having only one side arm, is employed instead of the two-sided swing arm 5. The single sided swing arm 205 has higher bending and torsional rigidity, sufficient to support the rear hub 6 without the need for a mating arm.

The swing arms 5, 205 are generally cantilevered in that all or most of their length, for example 75% or more, is unsupported by any other frame or suspension component.

The ends of the swing arms 5, 205 receive in full all vertical forces applied to the rear wheel 111 since they are in the only path for load to travel from the rear wheel 111 to the shock absorber 7 or frame 12. A bottom bracket cartridge assembly 9 is attached to the swing arm 5, 205 and provides a rotation pivot for the crank arm 2, pedal 25 and front sprocket 11. In particular, the bottom bracket cartridge assembly 9 comprises a housing containing bearings and an axle rotating around a crank axle rotational axis, or crank axis, 44. The bottom bracket cartridge assembly 9 screws into the pedal sleeve 36. Optionally, a separate axle, which may be integral with the crank arms, and bearing parts can be attached to the pedal sleeve 36 according to known techniques for conventional bottom brackets.

Figure 6:
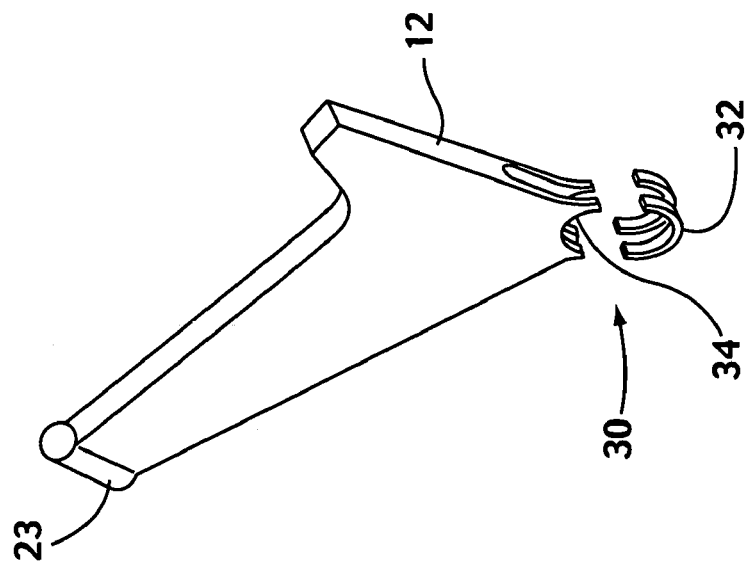
FIG. 6 is a left perspective exploded view of the frame of the first embodiment.
Figure 5:
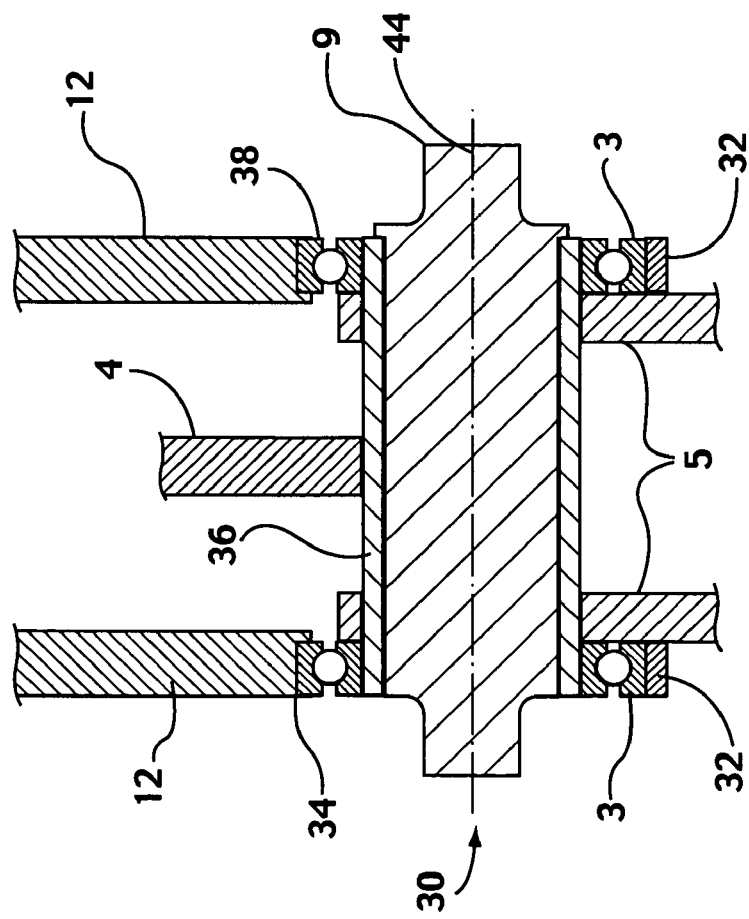
FIG. 5 is a partial cross-section of the first embodiment.

The pedal sleeve 36 and thus the swing arm 5, 205 and lever arm 4, are held in the frame 12 through a rotational connection provided by swing arm bearings 3. Swing arm bearings 3 are coaxial with and reside around the bottom bracket cartridge assembly 9. As shown in FIGS. 2A, 5 and 6, the swing arm bearings 3 are held in openings 34 in a bottom portion 30 of the frame 12. The openings 34 are defined in part by, and accessed through, one or more removable caps 32. A step 38 in each opening 34 locates the swing arm bearings 3 laterally. A retaining ring or other structure may also be used. To attach the swing arm 5 to the frame 12, the swing arm bearings 3 are press fit onto the ends of the pedal sleeve 36. The swing arm 5 and swing arm bearings 3 are then placed into the half of the openings 34 provided in the main part of the frame 12. Caps 32 are then screwed to the main part of the frame 12 to complete and close the openings 34 around the swing arm bearings 3. The pedal sleeve 36 and caps 32 or other parts of the openings 34 may optionally have various splines, abutments or other features of shape to withstand lateral forces between the swing arm 5 and the frame 12 in addition to or in place of the features described above.

Hence, a single pivot axis for the swing arm 5 exists that is coaxial with the axle for the pedals 25 and crank arms 2. In operation, when the bicycle encounters bumps in the road or terrain, the rear wheel 111 will act on the rear hub 6, driving it upward and downward. This motion will cause the swing arm 5, 205 to rotate about the bottom bracket rotational axis via bearings 3. Since the lever arm 4 is fixed to the swing arm 5, 205, it will rotate about the bottom bracket rotational axis at an angle equal to that of the swing arm 5, 205. The outer end of the lever arm 4, which is rotationally attached to the shock absorber element 7 via pivot pin 8, will activate the shock absorber 7 by pushing against it. Reaction forces from the shock absorber 7 will serve to return the lever arm 4 and hence the swing arm 5, 205 back to their original positions. In this manner, the swing arm 5, 205 can absorb shock loads experienced by the rear of the bicycle 100.

Figure 4:
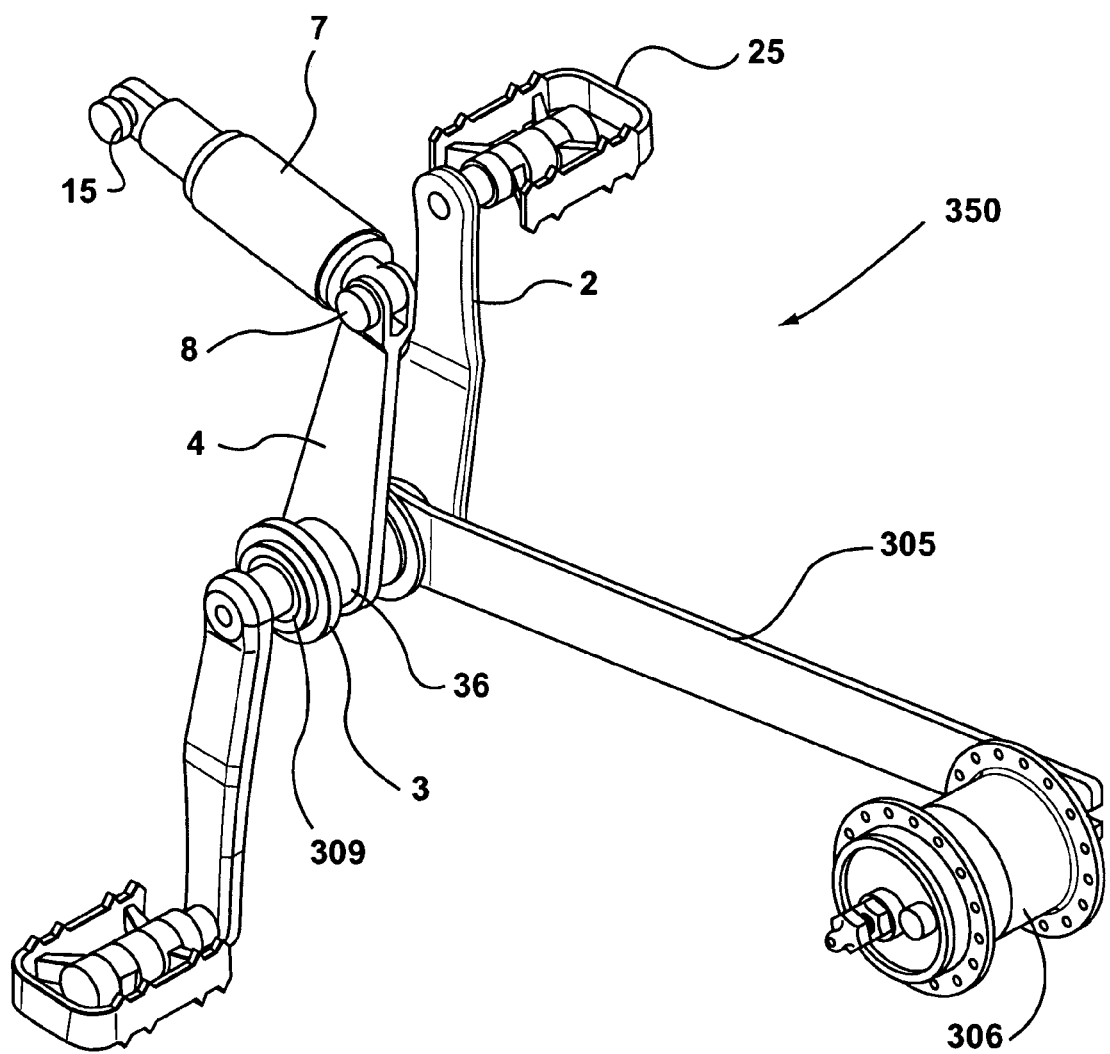
FIG. 4 is a left perspective view of the suspension system of the third embodiment, illustrating a bicycle with hydraulic drive means and single-sided swing arm.

In an alternate embodiment, a hydraulic drive replaces the conventional chain and sprocket arrangement. As illustrated in FIG. 4 for another single-sided swing arm 305, a hydraulic pump, details not shown, incorporates a modified button bracket assembly 309 and is located in or near the pedal sleeve 36, and a hydraulic motor, details not shown, is located adjacent to, or inside, a modified rear hub 306. Hydraulic lines, not shown, join the hydraulic pump to the hydraulic motor, such that there is a hydraulic connection between the two. This hydraulic drive system can be used to propel the bicycle in a manner such as that described in patent US Pat. No. 5,938,224, which is incorporated in full herein by this reference to it, for example. The hydraulic drive system illustrated in FIG. 4 can be used with a two-sided swing arm 5. Other drive mechanisms such as belts or rotating shafts may also be used. Other forms of multi-speed transmissions may also be used. For example, front or rear derailleurs may by attached to the trailing arm 5, 205 to allow for shifting between multiple sprockets of a set.

Optionally, the back of the frame 12 may be left open to a point above the top of the lever arm 4. This allows the swing arm 5, 205, 305 to rotate forward once the shock absorber element 7 is disconnected. With the front wheel 110 removed, the rear wheel 111 is able to move forward and occupy a space under the front of the frame 12 including much of the space where the front wheel 110 was prior to removal. This enables the bicycle 100 to be put into a more compact form, which facilitates storage in a smaller area.

In a fourth embodiment, shown in FIGS. 7 through 16, a generally cantilevered, single sided, compound trailing arm 600 is constructed from two components, a trailing arm inner member 55 and an outer cover 70. The trailing arm inner member 55 and outer cover 70 can be made of various materials, for example cast magnesium. A quick release lever arm 54 engages the shock absorber element 7 in a lever arm slot 89. The shock absorber element 7 is releasably held in the lever arm slot 89 by a flip lever 91 which can be flipped to release the shock absorber element 7. The chain 20 is looped over the front sprocket 11 and rear sprocket 14 in the conventional manner. An idler wheel 48 can be used to tension the chain 20 such that a conventional means for adjusting the location of a rear hub relative to the chain stay is not required. The idler wheel 48 also decreases the area occupied by the chain 20. A pedal assembly 46, consisting of a front sprocket 11, crank arms 2 and a crank axle and bearings, is attached to the pedal sleeve 36 in various ways, such as those known in the industry.

Figure 13:
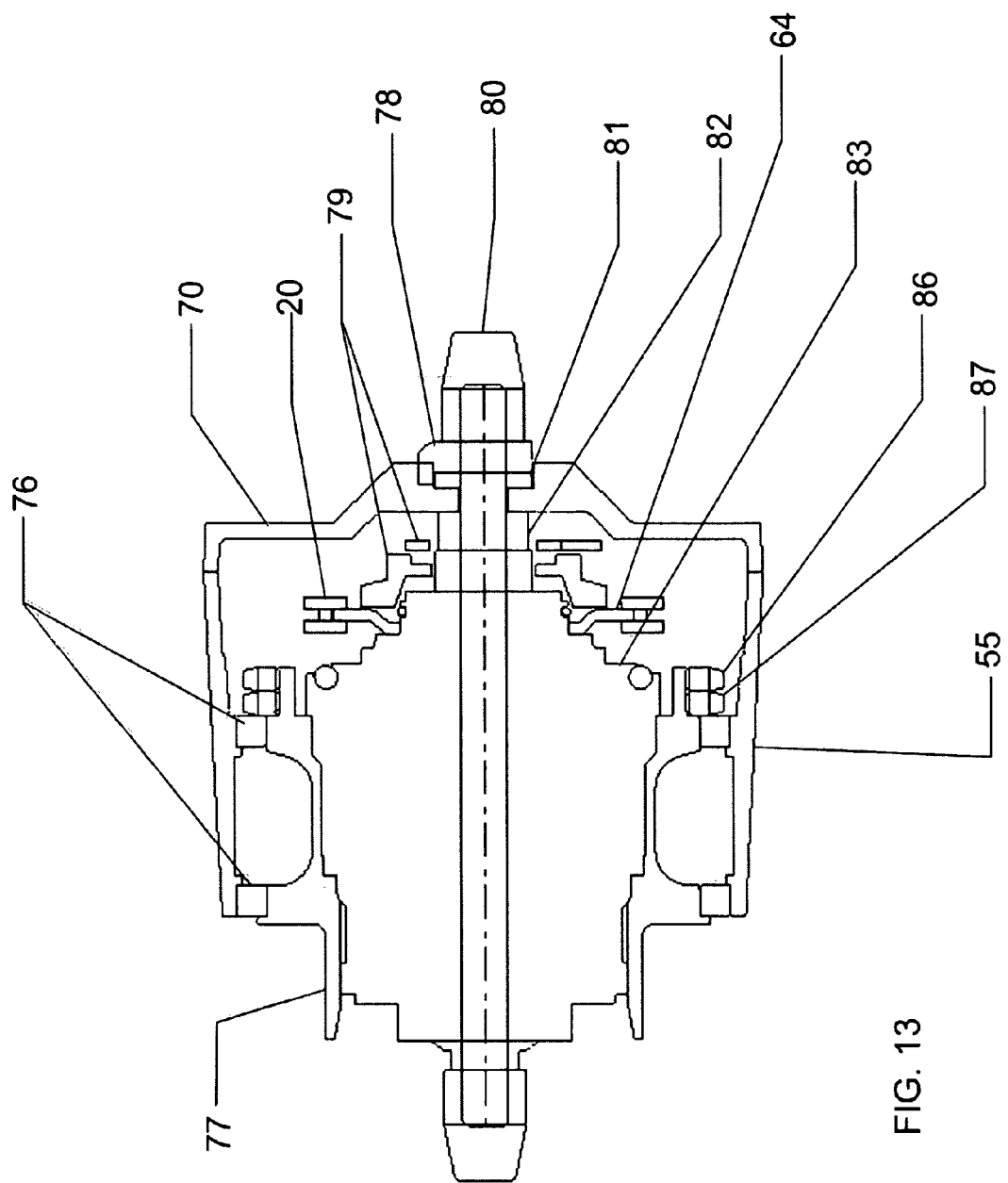
FIG. 13 is a cross-section A—A from FIG. 7.

Referring to FIG. 13, the rear sprocket 14 is joined to a transmission hub 83 by screwing, welding or other joining technology. The transmission hub 83 is of a type commonly available and sometimes called an internal rear hub mechanism because it has a cable operated shift mechanism 79 for changing gear ratios within the transmission hub 83. The cable travels to the shift mechanism 79 through the back part of the compound trailing arm 600 but is omitted from the drawings for clarity. A wheel hub 77, replacing the hub body found around a conventional transmission hub 83, is joined to the transmission hub 83 by pressing, welding, or other joining means. One side of the transmission hub 83 is attached to the outer cover 70 of the compound trailing arm 600 by nut 80 and washers 78, 81. The other side of the transmission hub 83 is held by rear wheel bearings 76 which hold the wheel hub 77 relative to the rear portion of the trailing arm inner member 55 but allow the rear wheel hub 77 to rotate. Bearing preload nut 87 is used to preload rear wheel bearings 76. Lock-nut 86 is used to keep bearing preload nut 87 from loosening. A three-spoke composite rear wheel 71 is joined to the wheel hub 77 via screws (not shown), but can be joined by other methods. The rear tire 72 is joined to the composite rear wheel 71 using methods that are common in the industry.

Figure 14:
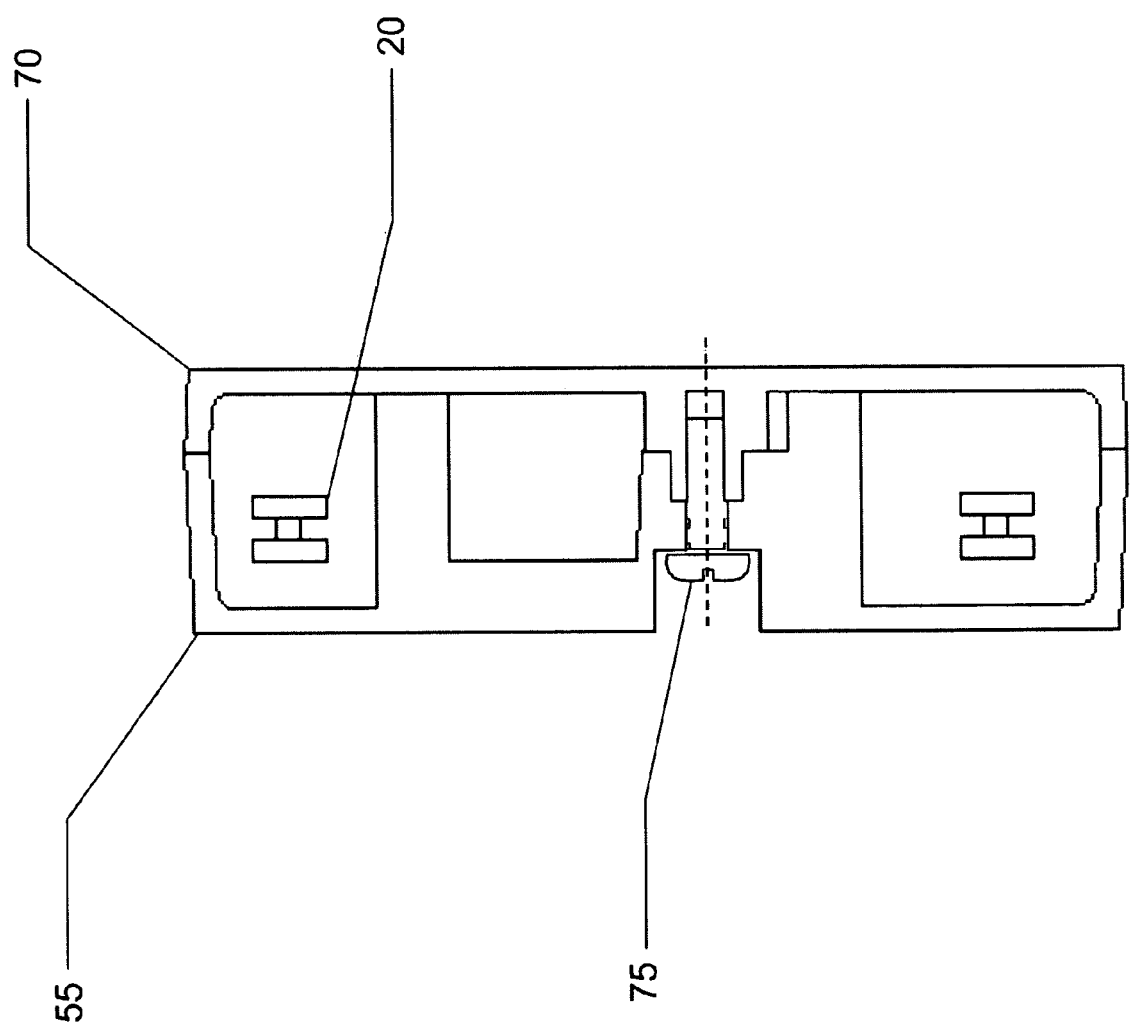
FIG. 14 is a cross-section B—B from FIG. 7.

Referring to FIG. 14, screws 75 keep the outer cover 70 attached to the trailing arm inner member 55. The screws 75 pass through holes 69 in the trailing arm inner member 55 and outer cover 70 to make a casing for the chain 20. The outer cover 70 adds structural strength to the trailing arm inner member 55 to help make the compound trailing arm 600 stiff in both bending and torsional twisting modes to provide for a precise ride and strong enough so that it will not break during normal riding. The chain 20 may also be completely enclosed by the composite swing arm 600, thus improving the visual appearance of the bicycle 100 and ensuring that the greasy chain 20 does not soil the rider. This arrangement also provides for a more clean appearance and protects the chain 20 from the elements. Optionally, the trailing arm inner member 55 and outer cover 70 may be assemblies of sub-components. For example, the outer cover 70 may be made in two parts so that the chain 20 can be exposed without removing the crank arms 2. Further optionally, the trailing arm inner member 55 may be designed to withstand all expected loads by itself, so that the outer cover 70 can be designed as a protective or decorative cover only.

Figure 15:
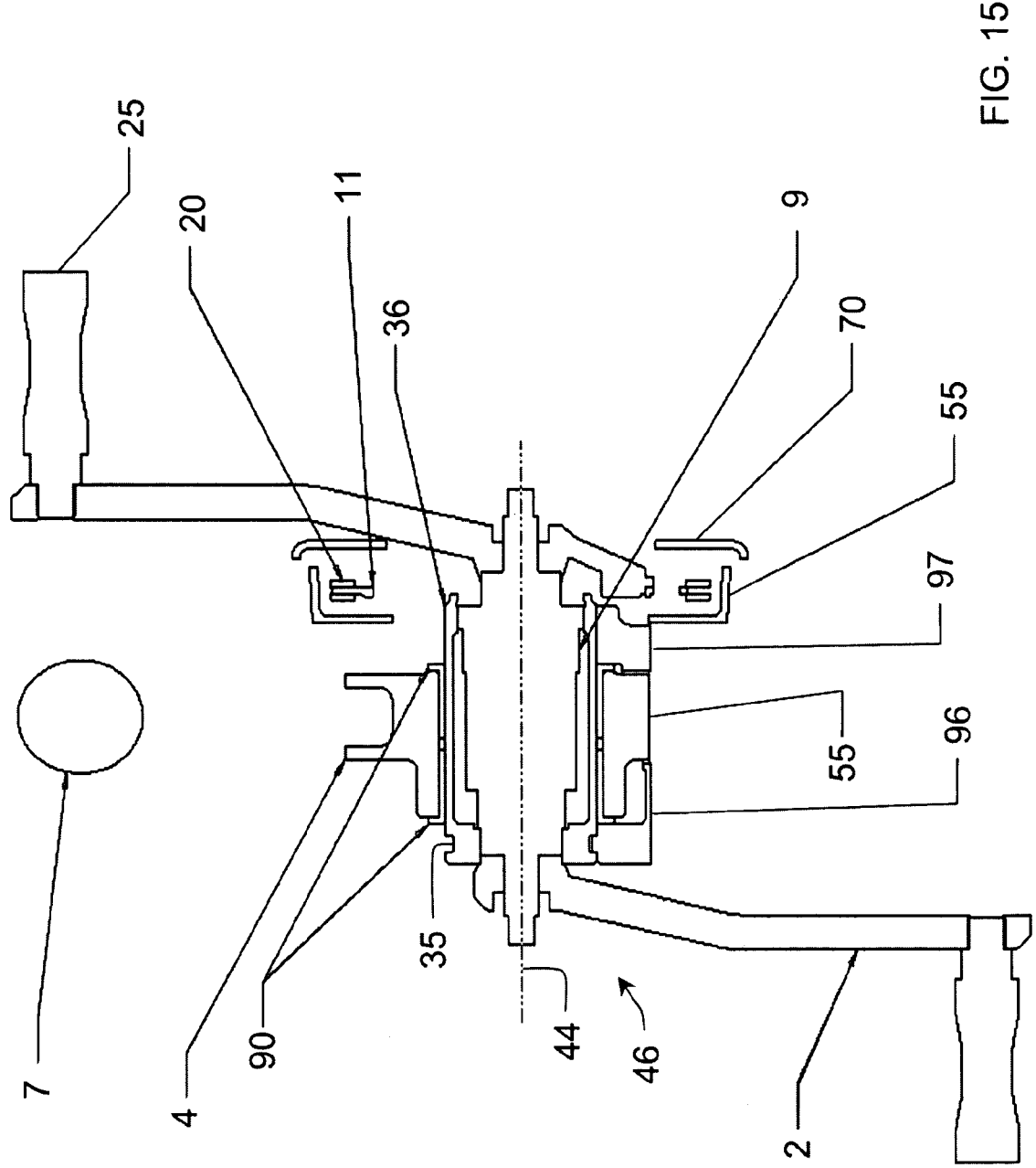
FIG. 15 is a cross-section C—C from FIG. 7.
Figure 16:
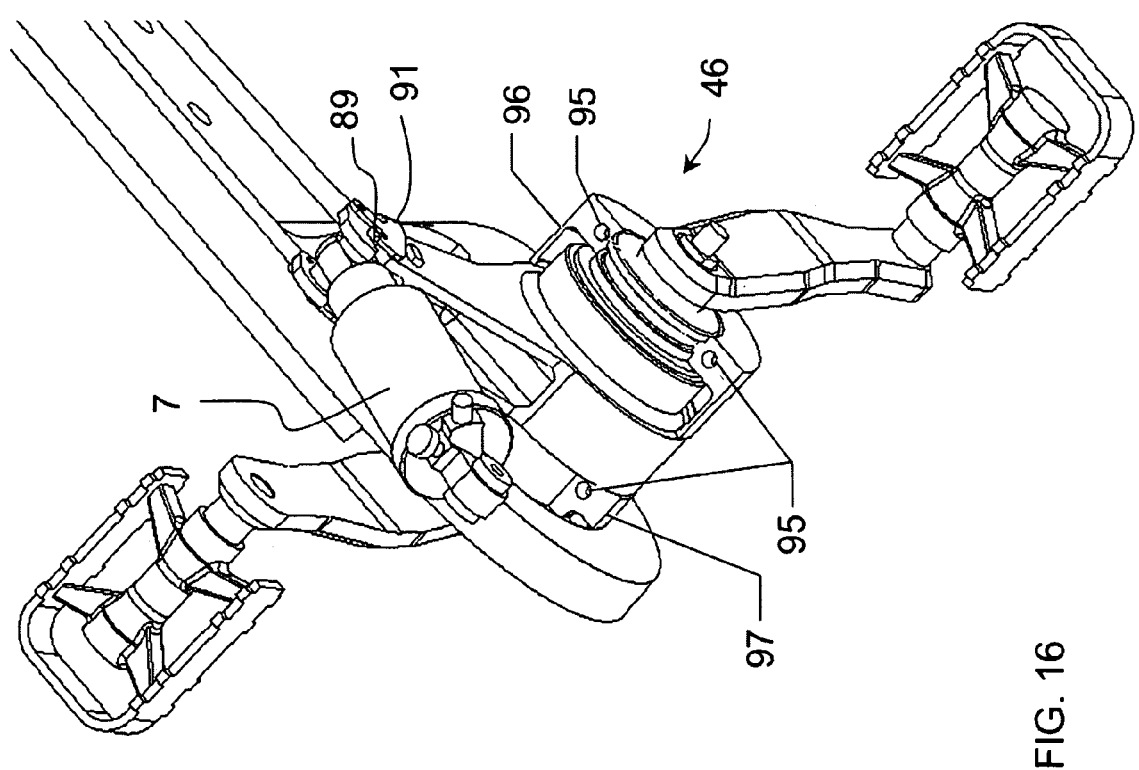
FIG. 16 is an enlarged pictorial view corresponding to the front part of FIG. 9.

FIGS. 15 and 16 show the construction around the pedal assembly 46. A bottom bracket cartridge assembly 9 provides an axle supported by bearings in a housing for rotation about the crank axis 44. Other means of supporting an axle may also be used. The crank arms 2 are joined to a bottom bracket cartridge assembly 9, for example, by one of the methods commonly used in the bicycle industry. The bottom bracket cartridge assembly 9 is held in the pedal sleeve 36 by press fit, screwing together or another method. The compound trailing arm 600 is pivotably attached to the pedal sleeve 36 through bushings 90 located around the outside of the pedal sleeve 36 but inside of the end of the compound trailing arm 600. Compound trailing arm 600 may rotate around the pedal sleeve 36 in bushings 90 at least through a selected degree of movement. This rotation may be oriented about the crank axis 44 through the center of the bottom bracket cartridge assembly 9.

To assemble the bicycle 100, the pedal sleeve 36 is placed into a semicircular recess in the bottom of each of two opposed sides of the frame 12. The sides of the frame 12 are spaced far enough apart to admit the quick release lever arm 54, shock absorber element 7 and bushings 90. A bottom portion 30 of the frame 12 is also open between the sides to allow the compound trailing arm 600 to exit through the back of the frame. A recess on one side of the frame has a ridge that fits into a groove 35 in one side of the pedal sleeve 36 to locate the pedal sleeve laterally within the frame 12. Bottom bracket caps 96, 97 having a semi-circular recess in their upper edges, are put in place against to capture the pedal sleeve 36 within the recesses of the frame 12 and caps 96, 97. The pedal sleeve 36, with its attached compound trailing arm 600 and pedal assembly 46 is then bolted to the bicycle 100 via cap holes 95 using bolts, not shown.

As described above, the crank axis 44 is fixed in position relative the frame. The bushings 90 allow the swing arm inner member 55 to rotate independently of the bottom bracket caps 96, 97 which are fixed to the bicycle 100. The compound trailing arm 600 can rotate independently of the bicycle 100 and the pedal cranks 2 can rotate independently of the compound trailing arm 600. The compound trailing arm 600 is pivotably attached to the frame 12 of the bicycle 100, but the frame 12 does not interfere with rotation of the compound trailing arm 600 through its expected range of motion. The frame 12 illustrated is a clamshell or monocoque frame 12 but other frames 12, such as a frame made of tubes, may be used. Optionally, the frame 12 may be left sufficiently open between the sides in the bottom portion 30 to allow the quick release lever arm 54 and compound trailing arm to rotate as required to make the bicycle more compact for storage, as will be described below.

The fourth embodiment, as for any of the previous embodiments, can be adapted to other drives. For example, a hydraulic drive, as described above, may be used. Shafts or belt drives may also be adapted for use with the compound trailing arm 600. Other forms of multi-speed transmissions may also be used. For example, front or rear derailleurs may by attached to the compound trailing arm 600 to allow for shifting between multiple sprockets of a set.

When the fourth embodiment is being ridden and encountering bumps in the road, the composite rear wheel 71 will act on the rear hub 77, driving it upward and downward. This will cause the trailing arm inner member 55 to rotate about the pedal sleeve 36 over bushings 90. Since the quick release lever arm 54 is fixed to the compound trailing arm 600, it will also rotate about the pedal sleeve 36 through an angle equal to the angular movement of the compound trailing arm 600. The upper end of the quick release lever arm 54, which is rotationally attached to the shock absorber element 7, will move in such a way as to activate the shock absorber element 7. Reaction forces from the shock absorber element 7 will dampen movement of the quick release lever arm 54 and return quick release lever arm 54 and compound swing arm 600 back to their original positions. In this manner, the compound swing arm 600 can provide for suspension of the rear of the bicycle 100. Pedaling function is the same as on a conventional rear hub transmission bicycle.

Figure 7:
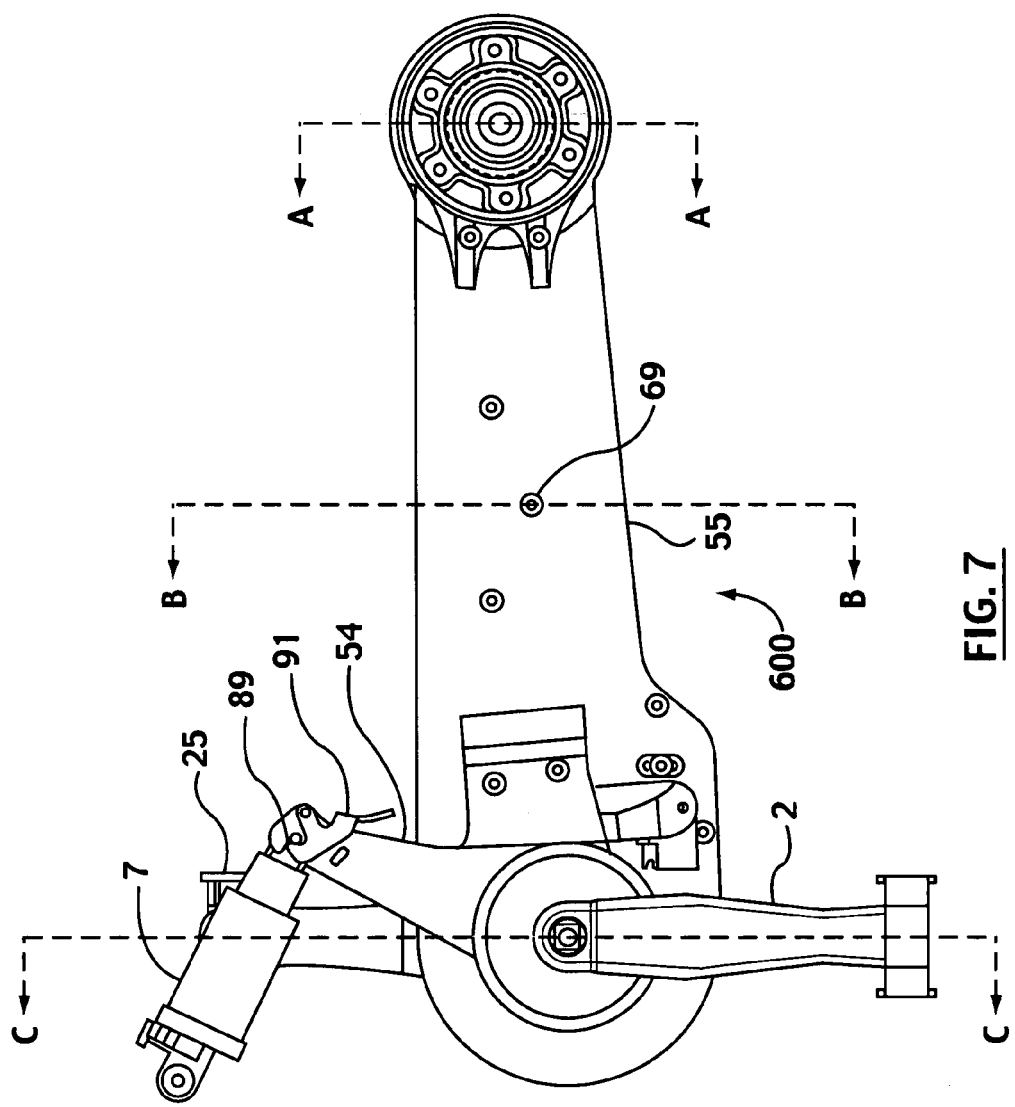
FIG. 7 is a left side view of parts of the suspension system of a fourth embodiment.
Figure 8:
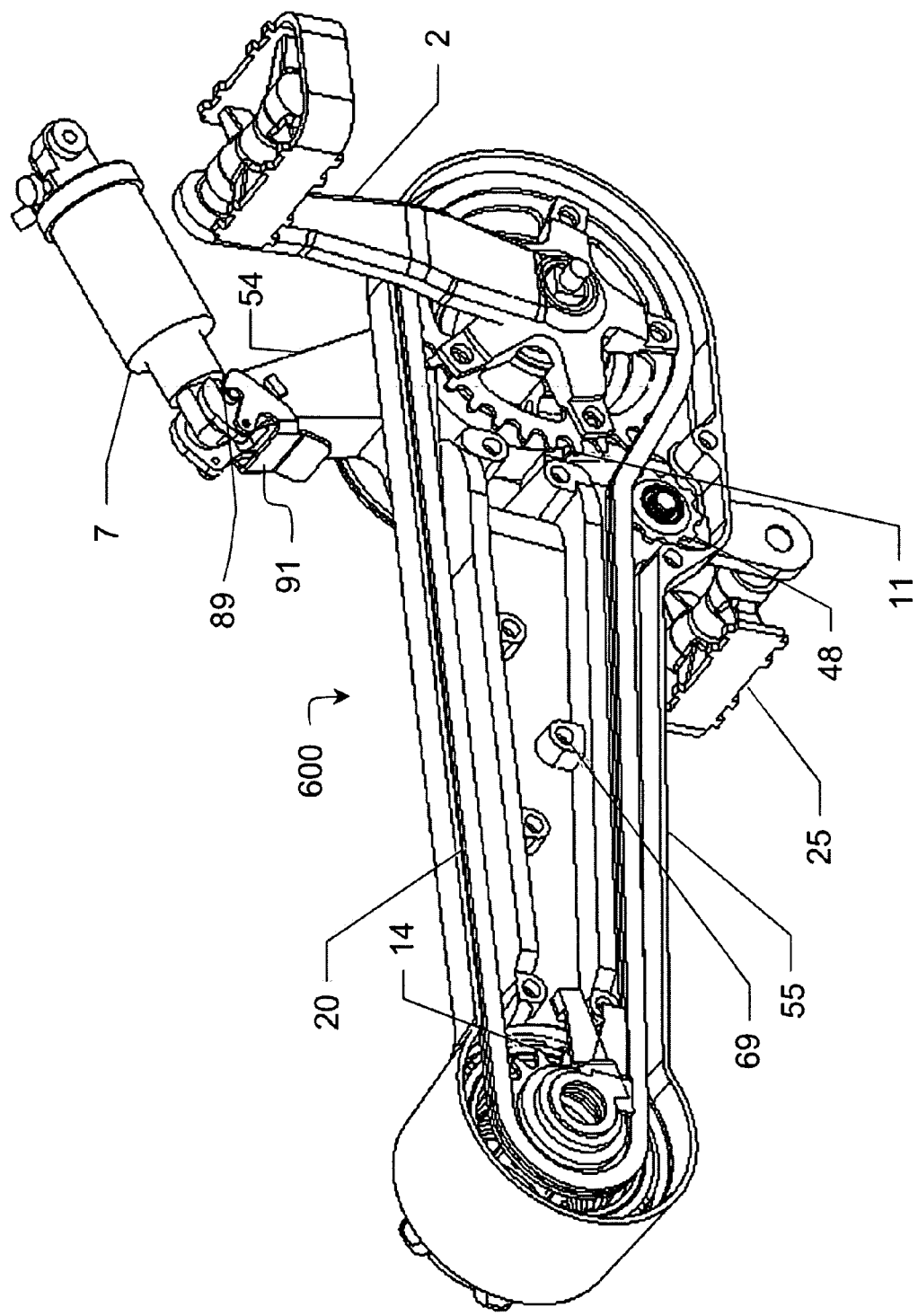
FIG. 8 is a right side pictorial view of the components of FIG. 7, but with a cover removed to show inner components.
Figure 9:
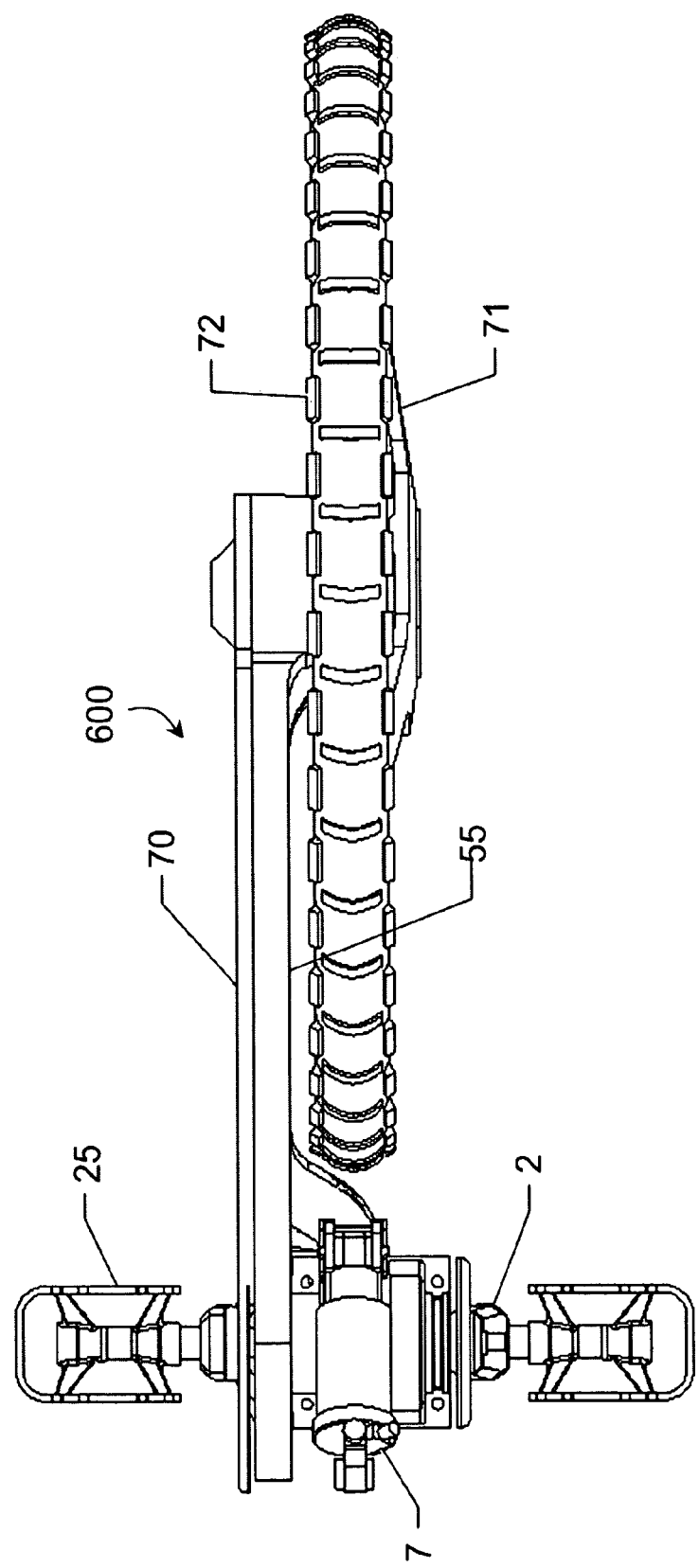
FIG. 9 is a top view of the components of FIG. 7 further including a rear wheel and parts of a frame.
Figure 10:
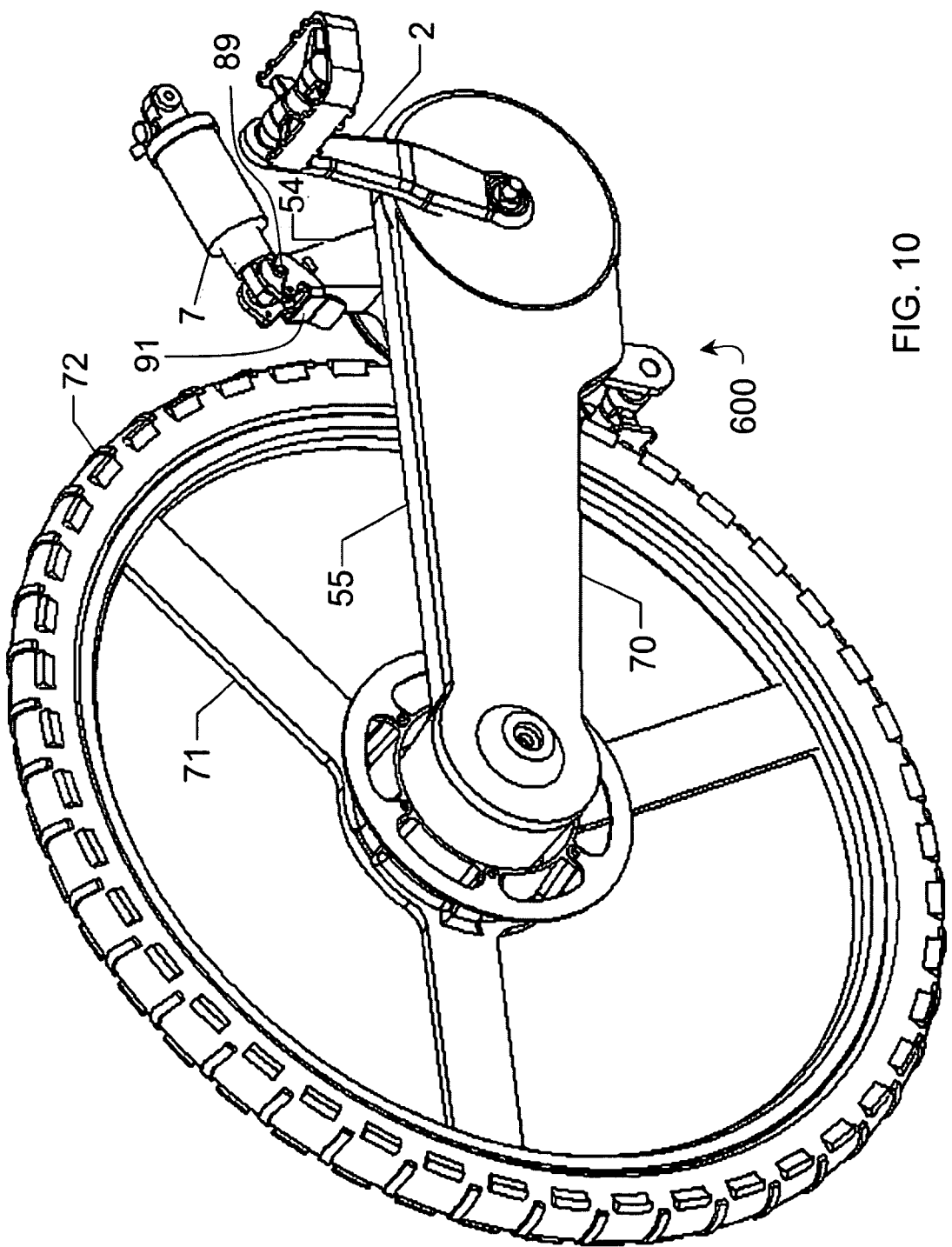
FIG. 10 is a right side pictorial view of the components of FIG. 7 with a rear wheel attached.
Figure 11:
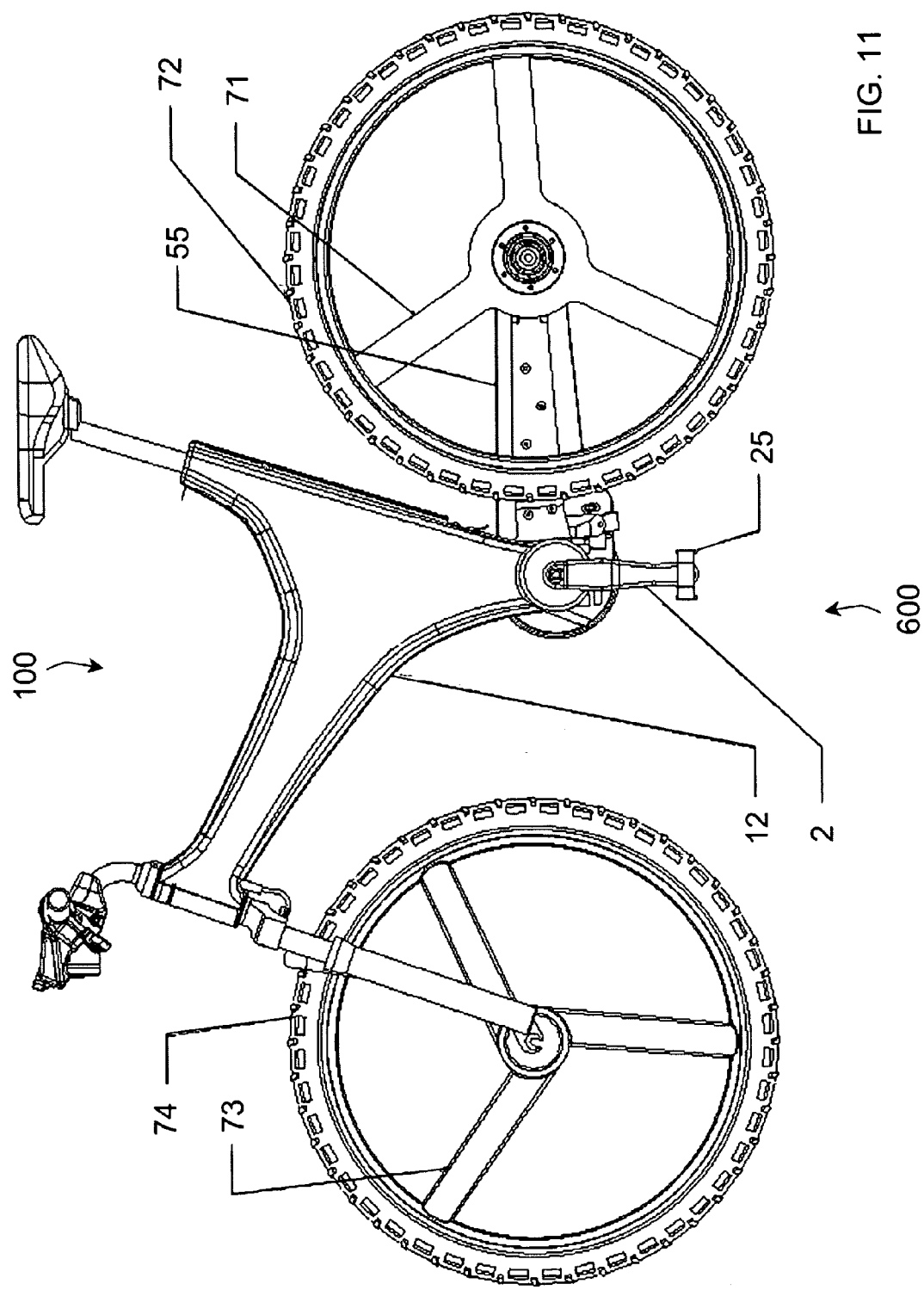
FIG. 11 is a side view of the complete bicycle of the fourth embodiment.
Figure 12:
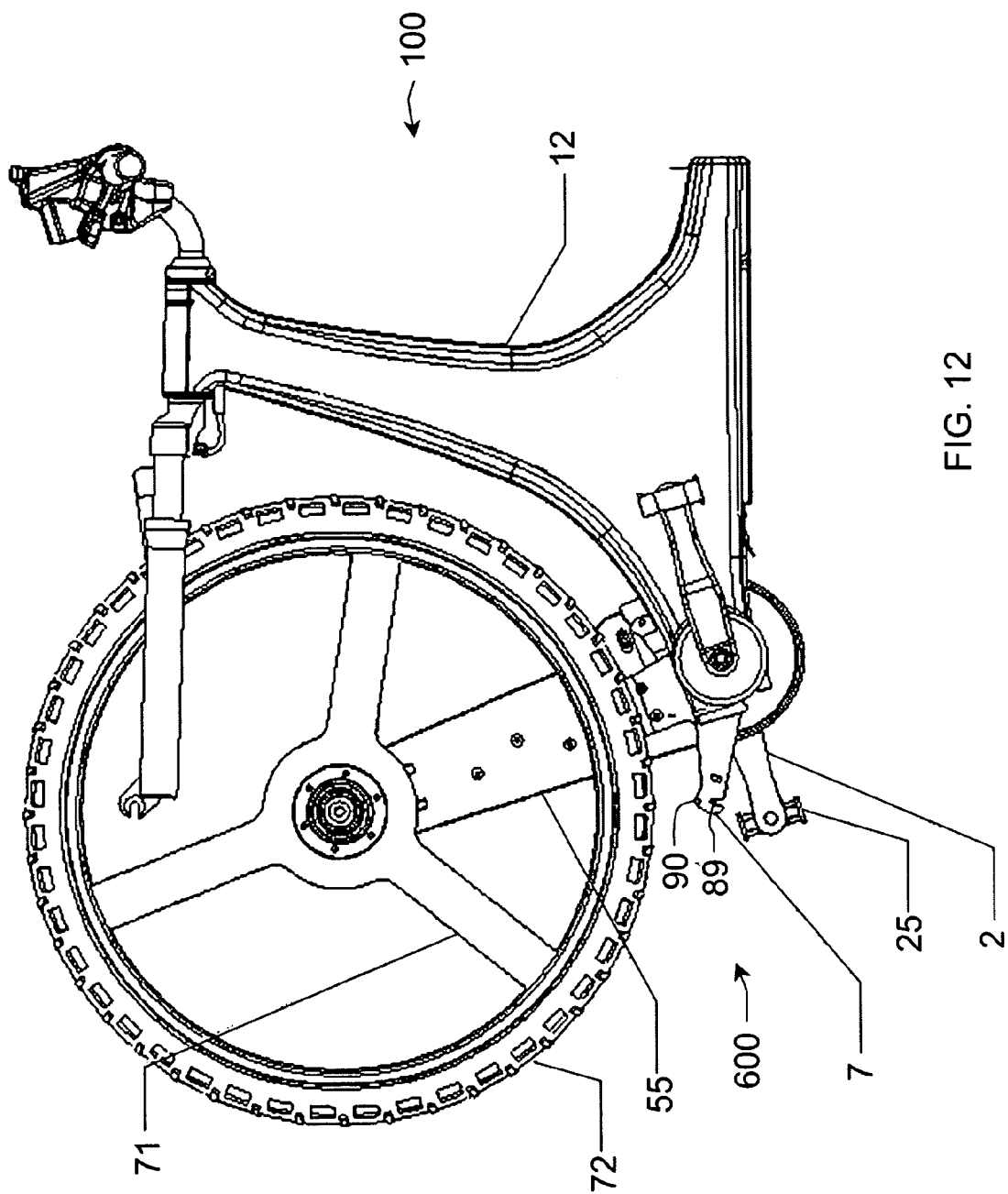
FIG. 12 is a side view of the bicycle of FIG. 11 compacted for storage.

The bicycle 100 of the fourth embodiment may be easily made more compact for storage. As shown in FIG. 7, the shock absorber element 7 is engaged into lever arm slot 89 in quick release lever 54 and held in place by flip lever 91. With the shock absorber element 7 engaged, the bicycle 100 appears as in FIG. 11. Referring to FIG. 12, if the flip lever 91 is released, and the composite front wheel 73 and front tire 74 are removed, then the compound trailing arm 600 may be rotated forward, for example by 135 degrees or more. The end of compound trailing arm 600 and rear composite wheel 71 then occupy a location under the front of the frame 12 of the bicycle 100 where the composite front wheel 73 and front tire 74 were previously located. This allows the bicycle 100 to be stored in more confined or compact spaces, particularly if the seat is also removed, as is shown in FIG. 12.

While various exemplary embodiments of the invention have been described above, the invention is not limited to the embodiments disclosed. For example, but without limitation, parts of the various embodiments may be mixed together. Any of the first, second or third embodiments could have their trailing arms 5, 205, 305 modified to shaped with a channel, have a cover 70, or hold a transmission hub 83 as for the compound trailing arm 600. The first, second or third embodiments could also be modified so that their trailing arms 5, 205, 305 rotate in a bushing 90 around a non-rotating pedal sleeve 36 as for the fourth embodiment. Similarly, the compound trailing arm 600 could be fixed to a pedal sleeve 36 held by swing arm bearings 3 to rotate relative to the frame 12 as for the first, second and third embodiments. In the fourth embodiment, the compound trailing arm 600 could also be modified to have two side arms or to hold a rear hub 6, 306 as in the first, second and third embodiments. Other or modified embodiments may be made within the scope of the invention protected by this patent which is defined by the following claims.

What is claimed is:

1. A suspension for a bicycle comprising:
   a bicycle frame, said frame having a bottom portion including a pedal sleeve;
   a pedal assembly secured for rotation within said pedal sleeve and rotating about a rotational axis;
   a swing arm pivotally secured to said frame for movement about said rotational axis;
   a lever arm attached to said swing arm; and, a shock absorbing element connected to said lever arm and said frame, wherein the lever arm extends from the pedal sleeve and rotates about the rotational axis and the lever arm and swing arm are attached together at a fixed angular displacement.

2. The suspension of claim 1 wherein the rotational axis has a fixed position relative to the frame and the pedal sleeve is rotatable about the rotational axis relative to the frame.

3. The suspension of claim 2 wherein the swing arm is fixed to the pedal sleeve and rotates with the pedal sleeve.

4. The suspension of claim 3 wherein the lever arm is fixed to the pedal sleeve and rotates with the pedal sleeve.

5. The suspension of claim 1 wherein the swing arm has a single side arm.

6. The suspension of claim 1 wherein the swing arm rotates around and relative to the pedal sleeve.

7. The suspension of claim 1 wherein the bottom portion of the frame has two sides and the shock absorbing element or lever arm is located between the two sides.

8. The suspension of claim 1 wherein the bottom portion of the frame has two sides and the swing arm is attached to the frame between the two sides.

9. The suspension of claim 1 wherein the swing arm is generally cantilevered and adapted to support an axle of a rear wheel in a fixed position relative the swing arm.

10. A rear wheel suspension system for a bicycle having,
a) a frame;
b) a pedal sleeve attached to and rotatable relative to the frame about a rotational axis having a fixed location relative to the frame;
c) a pedal assembly secured and rotatable within the pedal sleeve;
d) a trailing arm fixed for rotation with the pedal sleeve;
e) a shock absorbing element, wherein the trailing arm is biased towards a position relative to the frame by the shock absorbing element; and,
e) a lever arm fixed for rotation with the pedal sleeve wherein the shock absorbing element connects the trailing arm to the frame through the lever arm.

11. The suspension system of claim 10 wherein the frame has two sides where the frame is attached to the pedal sleeve.

12. The suspension system of claim 11 wherein the lever arm or shock absorbing element is located between the sides of the frame.

13. A suspension system for a bicycle comprising,
a) a frame having a bottom portion with two sides;
b) a pedal assembly secured for rotation to the bottom portion of the frame and rotatable about a rotational axis;
c) a swing arm secured to the bottom portion of the frame between the two sides of the frame and pivotable about the rotational axis; and,
d) a shock absorbing element wherein the swing arm is biased towards a position relative to the frame by the shock absorbing element, and wherein the swing arm has a single side arm.

14. The suspension system of claim 13 wherein the shock absorbing element is connected to the swing arm through a lever arm located on a line passing through the rotational axis at a fixed angular displacement of at least 45 degrees from the swing arm.

15. The suspension system of claim 13 wherein the pedal assembly rotates within a bottom bracket fixed to the frame and the swing arm rotates about a bearing surface outside of the bottom bracket.

16. The suspension system of claim 13 wherein the shock absorbing element is located between the sides of the bottom portion of the frame.

17. The suspension system of claim 13 wherein the sides of the frame are part of a stressed shell.

18. The suspension system of claim 13 wherein the side arm is adapted to hold or includes a rear wheel hub body.

19. The suspension system of claim 13 wherein the side arm comprises a portion having a channeled cross-section.

20. The suspension system of claim 13 further comprising one or more covers attached to the side arm to encloses a portion of the chain.

21. The suspension system of claim 13 wherein a portion of the side arm comprises a torsion box.

22. The suspension system of claim 13 wherein the connection between the swing arm and the frame through the shock absorbing element is releasable and, when the connection is released, the swing arm may pivot forward by more than 135 degrees.

23. The suspension system of claim 13 wherein the bottom portion of the frame includes a removable cap, the removable cap releasably securing the pedal assembly and trailing arm to the bottom portion of the frame.

24. The suspension system of claim 13 wherein the back of the trailing arm is attached to an internal rear hub shifting mechanism, the attachment including a bearing between the outside of the hub body of the shifting mechanism and the trailing arm.

25. The system of claim 24 further comprising an idler wheel connected to the trailing arm and positioned to tension a chain.

* * * * *